(12) United States Patent
Shirakawa et al.

(10) Patent No.: US 7,094,344 B2
(45) Date of Patent: Aug. 22, 2006

(54) FILTER DEVICE

(75) Inventors: Hiroyasu Shirakawa, Fujisawa (JP); Toshihiro Aramaki, Fujisawa (JP); Ichiro Tominaga, Fujisawa (JP)

(73) Assignee: NOK Corporation, Tokyo (JP)

( * ) Notice: Subject to any disclaimer, the term of this patent is extended or adjusted under 35 U.S.C. 154(b) by 259 days.

(21) Appl. No.: 10/713,157

(22) Filed: Nov. 17, 2003

(65) Prior Publication Data

US 2005/0103700 A1    May 19, 2005

(51) Int. Cl.
  *B01D 29/27*   (2006.01)
  *B01D 36/04*   (2006.01)
  *B01D 17/02*   (2006.01)
  *C02F 1/40*    (2006.01)

(52) U.S. Cl. ............ 210/301; 210/300; 210/308; 210/313; 210/799; 210/448; 210/452; 210/484; 210/485

(58) Field of Classification Search ........ 210/301, 210/300, 308, 310, 312, 313, DIG. 5, 799, 210/452, 448, 484, 485
See application file for complete search history.

(56) References Cited

U.S. PATENT DOCUMENTS

| | | | | |
|---|---|---|---|---|
| 1,235,395 A | * | 7/1917 | Storm | ............... 210/435 |
| 1,585,246 A | * | 5/1926 | Hoy | ............... 210/437 |
| 2,555,607 A | * | 6/1951 | Robinson | ............... 516/138 |
| 2,634,862 A | * | 4/1953 | Smith | ............... 210/238 |
| 2,851,164 A | * | 9/1958 | Morino | ............... 210/433.1 |
| 3,414,129 A | * | 12/1968 | Going et al. | ............... 210/798 |
| 3,450,632 A | * | 6/1969 | Huval et al. | ............... 210/799 |
| 3,468,421 A | * | 9/1969 | Bakker et al. | ............... 210/96.1 |
| 3,471,401 A | * | 10/1969 | Huval | ............... 210/702 |
| 3,853,766 A | * | 12/1974 | Gentry | ............... 210/236 |
| 4,039,441 A | * | 8/1977 | Fett | ............... 210/794 |
| 4,276,181 A | * | 6/1981 | Cordier et al. | ............... 210/741 |
| 5,236,585 A | * | 8/1993 | Fink | ............... 210/242.3 |
| 5,368,747 A | * | 11/1994 | Rymal et al. | ............... 210/744 |

* cited by examiner

*Primary Examiner*—Thomas M. Lithgow
(74) *Attorney, Agent, or Firm*—Jacobson Holman PLLC

(57) ABSTRACT

The present invention relates to a filter device for removing impurities contained in liquid. A filter housing 18 is provided with a container for accommodating a filter bag 2 therein, a deposit recovery tank 3 for recovering a deposit and a floating material recovery tank 4 for recovering a floating material. Thus, it is possible to prevent any deterioration of filtration performance caused by filtered and separated impurities, and to achieve both of filtration and specific gravity difference separation by a single device.

11 Claims, 20 Drawing Sheets

FILTER DEVICE

BACKGROUND OF THE INVENTION

1. Field of the Invention

The present invention relates to a filter device for removing impurities contained in liquid, and so on.

2. Description of the Related Art

There has been conventionally used a filter device by the use of a bag filter for the purpose of cleaning of liquid or the disposal of waste liquid.

A filter device in the conventional art will be explained in reference to FIGS. 18 to 20. FIG. 18 is a cross-sectional view schematically showing the configuration of a bag filter in the conventional art; and FIGS. 19 and 20 are diagrams illustrating the flow of a filter system by the use of the bag filter in the conventional art.

A bag filter 100 in the conventional art comprises a filter bag (bag-like filter) 101, a mesh-like bag filter bucket 102 for protecting the filter bag 101 and a filter presser 105 for positioning the filter bag 101. These are housed inside of a filter housing 108 (see FIG. 18).

Furthermore, the bag filter 100 comprises a cover 106 for the filter housing 108 and a clamp 107 for fixing the bag filter 100 at a predetermined position.

At the filter housing 108 are formed an inlet 103 for introducing liquid to be filtered into the filter housing and an outlet 104 for introducing filtered liquid (i.e., purified liquid) out of the filter housing. The bag filter 100 is used in the state in which the inlet 103 is located above while the outlet 104 is located below.

A filter system for performing specific gravity difference separation by the use of the bag filter 100 will be explained below in reference to FIGS. 19 and 20. Incidentally, the specific gravity difference separation signifies separating things of a specific gravity smaller than that of constituent liquid of purified liquid (liquid to be filtered) such as floating oil (for example, oil with respect to water).

In the filter system illustrated in FIG. 19, a pump 120 is disposed downstream of a cleaning tank 110. The bag filter 100 is disposed downstream of the pump 120. Moreover, a coalescer 130 is disposed downstream of the bag filter 100.

Cleaning liquid as liquid to be filtered contained inside of the cleaning tank 110 flows in a direction indicated by an arrow K by the pump 120. The cleaning liquid further flows in a direction indicated by an arrow L, to be filtered by the bag filter 100. Here, impurities contained in the cleaning liquid are separated, and then, the filtered liquid flows in a direction indicated by an arrow M.

Oil, which is small in specific gravity out of the filtered liquid, is separated by the effect of the specific gravity difference separation by the coalescer 130. The separated oil is discharged in a direction indicated by an arrow N.

The liquid, from which the impurities are separated and the oil is separated and removed, is allowed to flow in a direction indicated by an arrow O, and then, returns to the cleaning tank 110.

In a filter system illustrated in FIG. 20, a hollow fiber membrane module (UF: ultrafiltration) 140 is further disposed downstream of a coalescer 130, unlike the system illustrated in FIG. 19. With this system, the liquid after the oil is discharged is further cross-flow filtered by hollow fiber membrane module 140. Consequently, finer impurities can be removed. Here, the liquid which is not filtered by the hollow fiber membrane module 140 returns upstream of a pump 120.

The above-described bag filter 100 is used such that the opening formed at the bag-like filter bag 101 is located above. And, the liquid to be filtered is allowed to flow in through the inlet 103 located above, and then, the filtered liquid is allowed to be flow out through the outlet 104 located below. In this manner, the filtration is performed. Therefore, the impurities to be filtered are liable to stay at the lower portion of the bag-like filter. In this way, if the impurities are deposited at the lower portion of the filter, a filtration effective area is reduced. This shortens the lifetime of the filter.

Moreover, in the above-described bag filter 100, the liquid flowing into the bag filter is agitated by the flow. As a consequence, the bag filter 100 cannot perform the specific gravity difference separation. Thus, in order to perform the specific gravity difference separation, a special tank for recovering the floating oil or the like (such as the above-described coalescer 130) is required independently.

SUMMARY OF THE INVENTION

An object of the present invention is to prevent the deterioration of filtration performance caused by impurities which are filtered and separated.

Furthermore, another object of the present invention is to achieve both of filtration and specific gravity difference separation by a single device.

That is to say, one aspect of the present invention is to provide a filter device comprising: a filter for filtering liquid to be filtered and separating impurity particles contained in the liquid to be filtered; and a deposit recovery tank for depositing particles having a specific gravity greater than that of the liquid to be filtered out of the impurity particles, which are not filtered but separated by the filter, so as to recover them at a position apart from the filter.

Consequently, the impurity particles which are not filtered but separated can be deposited and recovered in the deposit recovery tank, thereby reducing the adhesion and deposition of the impurity particles to and in a membrane of the filter.

The deposit recovery tank may be disposed under the filter, and an orifice may be formed at an inlet of the deposit recovery tank.

As a consequence, it is possible to prevent any agitation of the deposit deposited inside of the deposit recovery tank by the flowing liquid to be filtered.

Furthermore, another aspect of the present invention is to provide a filter device comprising: a filter for filtering liquid to be filtered and separating impurity particles contained in the liquid to be filtered; and a floating material recovery tank capable of allowing a component of a smaller specific gravity to float and recovering it out of liquid filtered by the filter.

Consequently, the filtration and separation by the filter and the specific gravity difference separation based on a specific gravity difference can be performed by a single device.

The floating material recovery tank may be disposed above the filter, and an orifice may be formed at an inlet of the floating material recovery tank.

As a consequence, it is possible to prevent any agitation of the floating material recovered in the floating material recovery tank by the flowing liquid to be filtered.

Furthermore, still another aspect of the present invention is to provide a filter device comprising: a filter for filtering liquid to be filtered and separating impurity particles contained in the liquid to be filtered; a deposit recovery tank for depositing particles having a specific gravity greater than that of the liquid to be filtered out of the impurity particles, which are not filtered but separated by the filter, so as to recover them at a position apart from the filter; and a floating material recovery tank capable of allowing a component of a smaller specific gravity to float and recovering it out of liquid filtered by the filter.

Consequently, the impurity particles which are not filtered but separated in the deposit recovery tank can be deposited and recovered, thereby reducing the adhesion and deposition of the impurity particles to and in a membrane of the filter, and the filtration and separation by the filter and the specific gravity difference separation based on a specific gravity difference can be performed by a single device.

The deposit recovery tank may be disposed under the filter, the floating material recovery tank may be disposed above the filter, and orifices may be formed at inlets of the deposit recovery tank and the floating material recovery tank, respectively.

As a consequence, it is possible to prevent any agitation of the deposit deposited inside of the deposit recovery tank by the flowing liquid to be filtered and the floating material recovered in the floating material recovery tank by the flowing liquid to be filtered.

DETAILED DESCRIPTION OF THE PREFERRED EMBODIMENTS

Preferred embodiments according to the present invention will be illustratively described below in reference to the accompanying drawings. Incidentally, the dimension, material, shape, relative arrangement and the like of constituent parts described in the embodiments are not limited to them with respect to the scope of the invention unless there are specified descriptions.

FIRST EMBODIMENT

Figure 1:
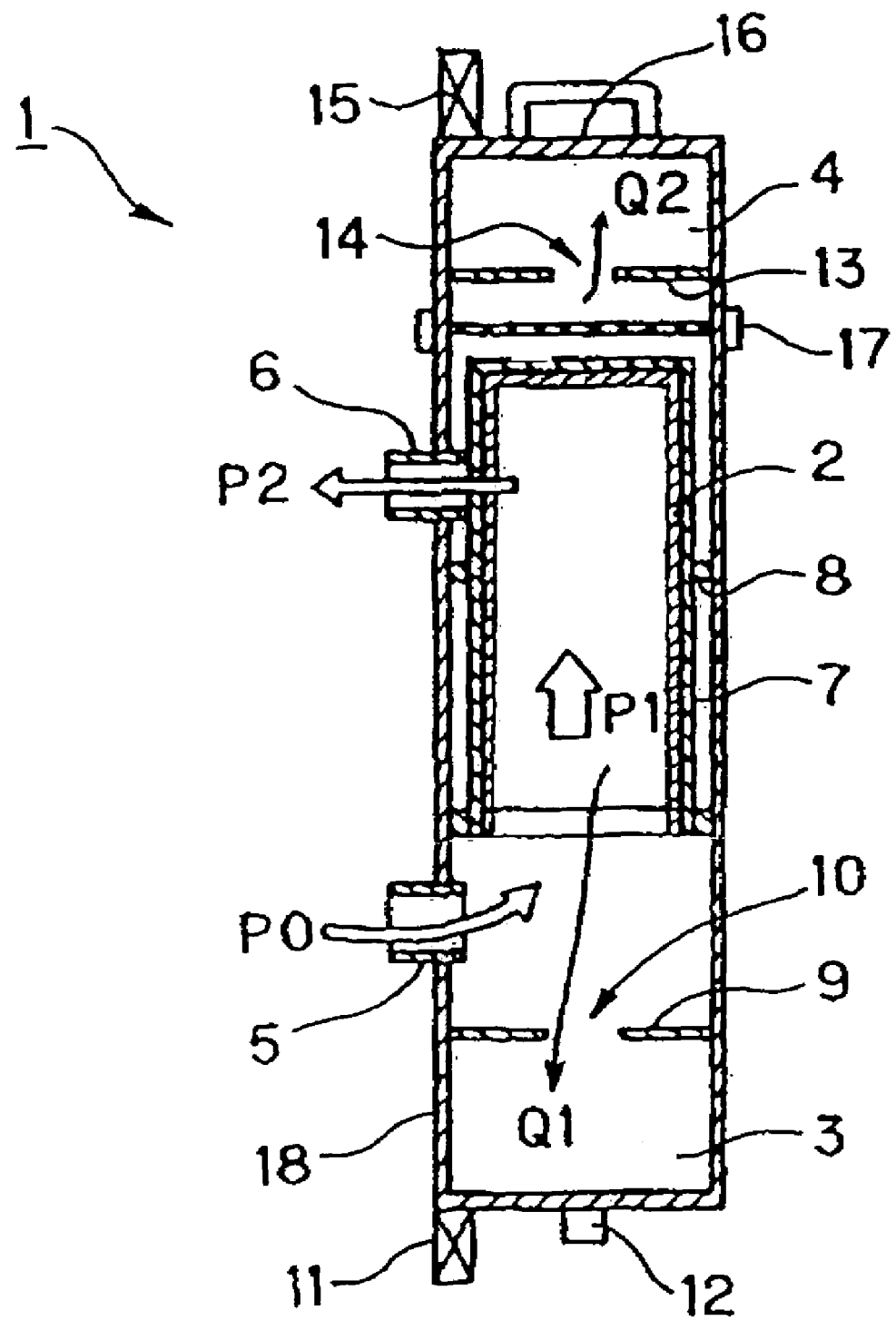
FIG. 1 is a cross-sectional view schematically showing the configuration of a filter device in an embodiment according to the present invention.

Referring to FIG. 1, explanation will be made on a filter device according to a first embodiment of the present invention. FIG. 1 is a cross-sectional view schematically showing the configuration of the filter device according to the first embodiment of the present invention.

As shown in FIG. 1, a filter housing 18 in a filter device 1 in the present embodiment comprises a container for accommodating a filter bag (a bag-like filter) 2, a deposit recovery tank 3 for recovering a deposit and a floating material recovery tank 4 for recovering a floating material.

The filter bag 2 is covered with a mesh-like bag filter bucket 7 made of metal or the like, and thus, is protected. Furthermore, the filter bag 2 is positioned by a filter presser 8 disposed at the filter housing 18. Moreover, the filter device 1 in the present embodiment is used in the state in which the opening of the bag-like filter bag 2 is oriented downward.

The deposit recovery tank 3 is located at a position under the filter bag 2 at the time of installation. A shield plate 9 having an orifice 10 formed thereat is provided at an inlet of the deposit recovery tank 3. In addition, a drain port 12 for discharging the fluid staying inside is formed at the deposit recovery tank 3. In the case where no orifice 10 is formed, the distance between an inlet 5 and a discharge valve 11 is set sufficiently. In this case, the entire length of the housing becomes long.

Even if the deposit cannot be sufficiently reserved by limiting the space of the deposit recovery tank 3, there arises no problem since the reserved deposit can be discharged to the outside through the discharge valve 11.

The floating material recovery tank 4 is located at a position above the filter bag 2 at the time of the installation. A shield plate 13 having an orifice 14 formed thereat is provided at an inlet of the floating material recovery tank 4. In the case where no orifice 14 is formed, the distance between an outlet 6 and a discharge valve 15 is set sufficiently. In this case, the entire length of the housing becomes long.

Even if the floating material cannot be sufficiently reserved by limiting the space of the floating material recovery tank 4, there arises no problem since the reserved floating material can be discharged to the outside through the discharge valve 15.

Additionally, the filter device 1 is provided with a cover 16 for the filter housing 18 and a clamp 17 for fixing the filter device 1 at a predetermined position.

At the filter housing 18 are formed the inlet 5 for introducing in the liquid to be filtered into the filter device 1 and the outlet 6 for introducing out the filtered liquid (i.e., purified liquid). The filter device 1 is used in the state in which the inlet 5 is located under the filter bag 2 and above the deposit recovery tank 3 while the outlet 6 is located above the inlet 5 and under the floating material recovery tank 4.

Explanation will be made below on the case where a water-based metallic part cleaning liquid (hereinafter called simply referred to as "a cleaning liquid") as one example of the liquid to be filtered is filtered by the use of the filter device 1 such configured as described above. Here, the cleaning liquid contains therein (1) chippings of a workpiece (i.e., settling particles), (2) floating oil (i.e., a floating oil component) and (3) suspended scum as impurities.

First, the cleaning liquid flows in through the inlet 5 (as indicated by an arrow P0), and then, advances into the filter bag 2 (as indicated by an arrow P1). Through the membrane of the filter, (1) the settling fine particles and (3) the suspended scum out of the impurities are separated by the filtration.

The impurities, each of which has a diameter greater than the pore diameter of the filter and cannot be trapped at the surface of the filter or inside of the filter, in particular, (1) the settling particles have a specific gravity greater than that of the cleaning liquid, and therefore, they are gradually deposited (as indicated by an arrow Q1). The settling particles are finally recovered in the deposit recover tank 3 through the orifice 10.

Incidentally, the formation of the orifice 10 can prevent agitation of the settling particles recovered in the deposit recover tank 3 by circulating liquid to be cleaned (liquid before filtration by the filter, that is, liquid before cleaning).

The floating oil component having a specific gravity smaller than that of the cleaning liquid, contained in the cleaning liquid floats up through the filter (as indicated by an arrow Q2). The floating oil component is recovered in the floating material recovery tank 4 through the orifice 14. Here, it is preferable that the material of the filter should be lipophilic (for example, polypropylene). In this manner, the filter can promote the coarseness of the dispersed oil. Consequently, the oil is promoted to float up by increasing the diameter of the particle, so that the oil can be readily recovered.

Incidentally, the formation of the orifice 14 can prevent any agitation of the floating oil component by the circulating cleaning liquid.

In this way, only the liquid after the separation of the impurities by the filtration of the filter and the separation of the component having the smaller specific gravity by the specific gravity difference separation is allowed to flow out of the outlet 6 (as indicated by an arrow P2).

As described above, in the filter device 1 in the present embodiment, the particles having a greater diameter, which markedly affects the reduction of a filtration effective area, out of the impurities separated by the membrane of the filter are recovered in the deposit recovery tank 3. As a consequence, the particles cannot stay at the surface of the membrane of the filter, thereby suppressing the reduction of the filtration effective area. Thus, it is possible to enhance the stability of the filtration performance and prolong the lifetime of the filter.

Additionally, in the filter device 1 according to the present embodiment, the separation of the impurities by the filtration of the filter and the separation of the component having the smaller specific gravity by the specific gravity difference separation can be performed by the single device. Consequently, it is unnecessary to independently provide a coalescer or the like, so as to reduce the number of component parts and save the space of the system.

Figure 2:
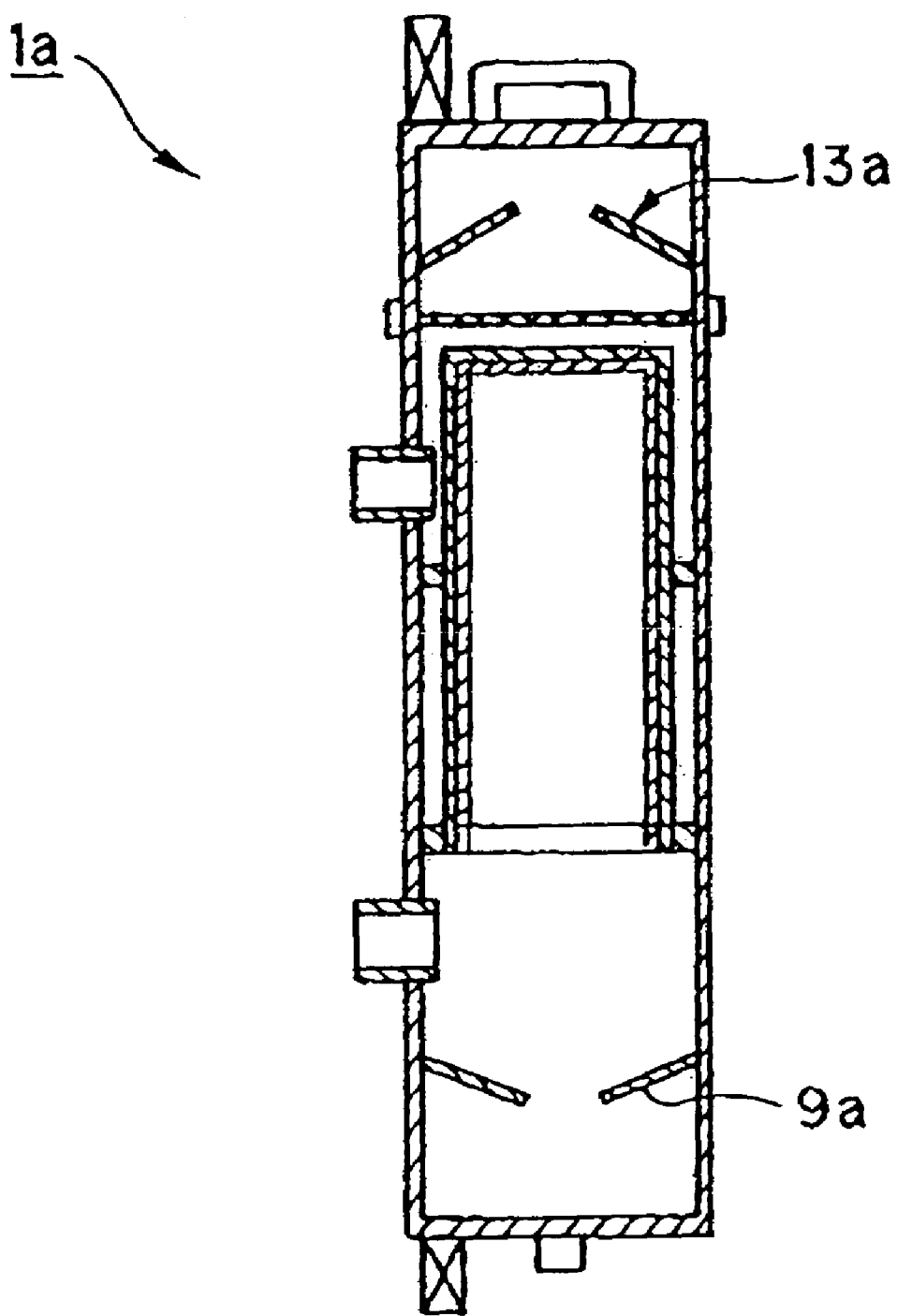
FIG. 2 shows a modification of FIG. 1.

FIG. 2 is a view showing a modification example in which the shield plate 9 and the shield plate 13 are modified.

In a filter device 1a shown in FIG. 2, a shield plate 9a is inclined such that an orifice serving as an inlet of a deposit (a settling particle) is oriented toward the inside of a deposit recovery tank. In the same manner, a shield plate 13a is inclined such that an orifice serving as an inlet of a floating material (i.e., a floating oil component) is oriented toward the inside of a floating material recovery tank.

Thus, the deposit or the floating material can be smoothly recovered.

Next, examples of filter systems by the use of the filter device 1 in the above-described embodiment will be explained in reference to FIGS. 3 to 5.

EXAMPLE 1

Figure 3:
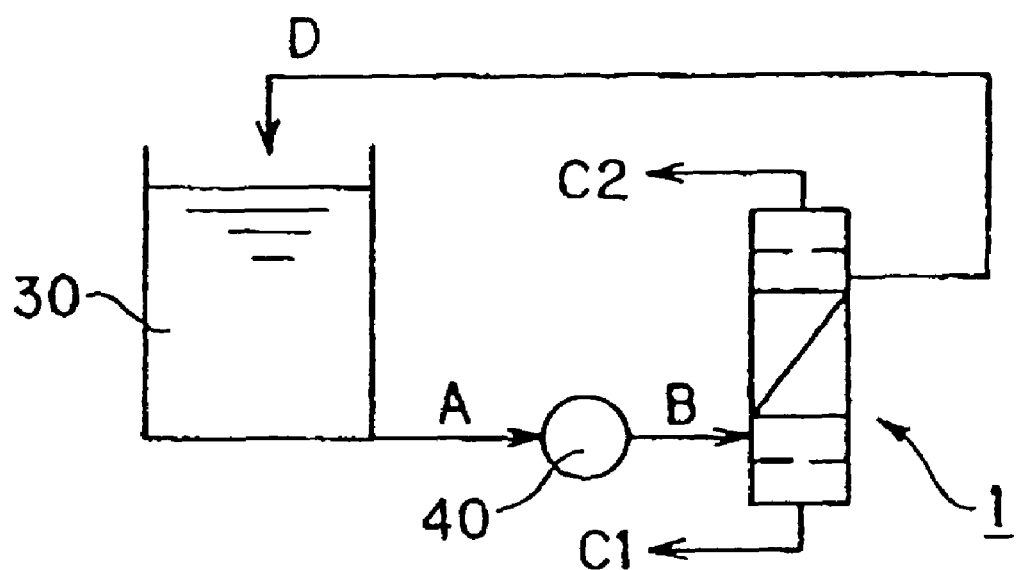
FIG. 3 is a diagram illustrating the flow of a filter system in a first example, to which the filter device according to the embodiment of the present invention is applied.

FIG. 3 is a diagram illustrating the flow in a filter system to recycle the cleaning liquid.

In this filter system, a pump 40 is disposed downstream of a cleaning tank 30 containing the cleaning liquid therein, and further, a filter device 1 is disposed downstream of the pump 40.

The cleaning liquid contained inside of the cleaning tank 30 flows in a direction indicated by an arrow A by means of the pump 40. And then, the cleaning liquid flows in a direction indicated by an arrow B, and thus, flows into the filter device 1. As described above, by the filter device, the cleaning liquid is subjected to impurity separation by the filtration of the filter and separation of a component small in specific gravity by the specific gravity difference separation. Thereafter, cleaning liquid flows in a direction indicated by an arrow D, and thus, is returned to the cleaning tank 30.

Incidentally, recovered deposit is appropriately discharged in a direction indicated by an arrow C1 by a discharge valve 11. Moreover, a recovered floating material is appropriately discharged in a direction indicated by an arrow C2 by a discharge valve 15.

EXAMPLE 2

Figure 4:
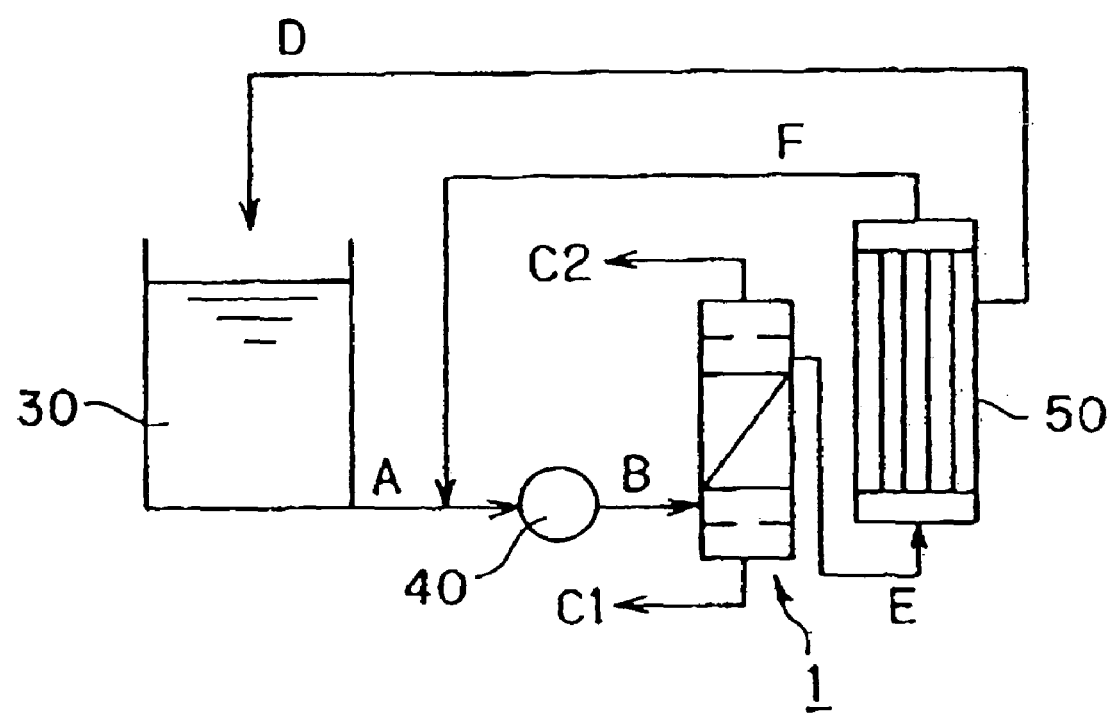
FIG. 4 is a diagram illustrating the flow of a filter system in a second example, to which the filter device according to the embodiment of the present invention is applied.

FIG. 4 is a diagram illustrating the flow in a filter system to recycle the cleaning liquid.

In the filter system in this example, a hollow fiber membrane module (UF: ultrafiltration) 50 is disposed downstream of a filter device 1, unlike the system in Example 1. In this system, liquid filtered by the filter device 1 is further cross-flow filtered by the hollow fiber membrane module 50. Consequently, finer impurities can be removed. The cross-flow filtration by the hollow fiber membrane module 50 can suppress adhesion of particles and oil to a hollow-fiber membrane, thereby achieving a stable transmitted liquid flow rate. Liquid which cannot be filtered by the hollow fiber membrane module 50 is returned to the upstream side of a pump 40.

Incidentally, in this system, a condensed deposit and floating material are continuously recovered and discharged. Consequently, the cleaning liquid is allowed to steadily flow on a circulation path.

EXAMPLE 3

Figure 5:
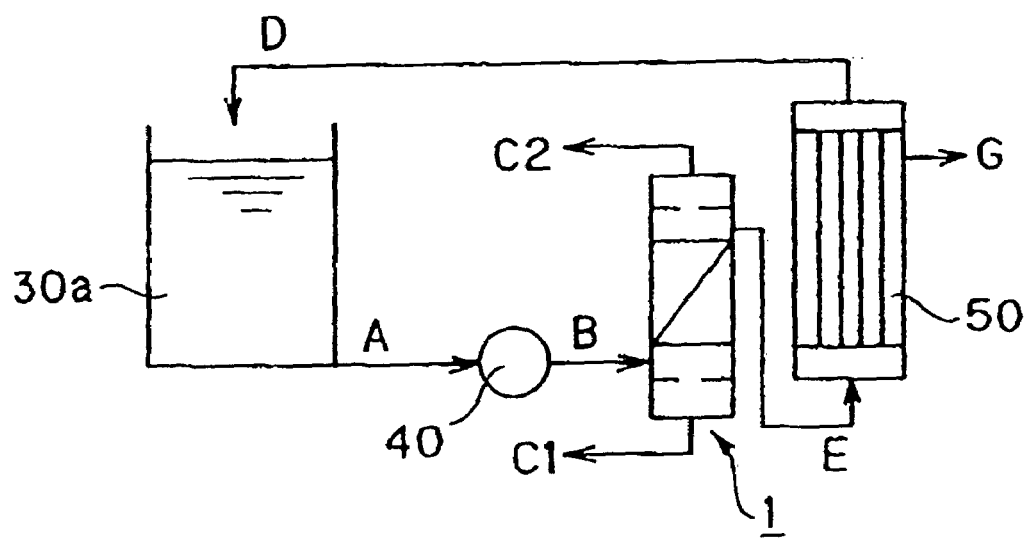
FIG. 5 is a diagram illustrating the flow of a filter system in a third example, to which the filter device according to the embodiment of the present invention is applied.

FIG. 5 is a diagram illustrating the flow in a filter system in the case where a filter device is used in a waste liquid process.

In the filter system, a pump 40 is disposed downstream of a waste liquid tank 30a containing waste liquid therein, and further, a filter device 1 is disposed downstream of the pump 40. Furthermore, a hollow fiber membrane module 50 is disposed downstream of the filter device 1.

The waste liquid contained in the waste liquid tank 30a flows in a direction indicated by an arrow A by the pump 40. The waste liquid flows in a direction indicated by an arrow B, and then, flows into the filter device 1. As described above, by the filter device, the waste liquid is subjected to impurity separation by the filtration of the filter and separation of a component small in specific gravity by the specific gravity difference separation. Thereafter, the waste liquid flows in a direction indicated by an arrow E, followed by cross-flow filtration by the hollow fiber membrane module 50. The liquid which has not been filtered flows in a direction indicated by an arrow D, and then, is returned to a cleaning tank 30.

In contrast, the liquid which has been purified by the filter device 1 and further filtered by the hollow fiber membrane module 50 is discharged outside of the system (in a direction indicated by an arrow G), and thus, is appropriately used.

OTHER EXAMPLES

The above descriptions have been given of the configurations in which the filter device is provided with both the deposit recovering function and the floating material recovering function. However, in the case where no deposit or floating material is contained in the liquid to be filtered, the filter device may be provided with only either one of the floating material recovering function and the deposit recovering function.

SECOND EMBODIMENT

Referring to FIGS. 6 to 13, explanation will be made on a filter device according to a second embodiment of the present invention. In the present embodiment, a description will be given of easy recovery of a deposit or a floating material and easy attachment fixture of a filter in addition to the basic configuration described in the first embodiment.

Figure 6:
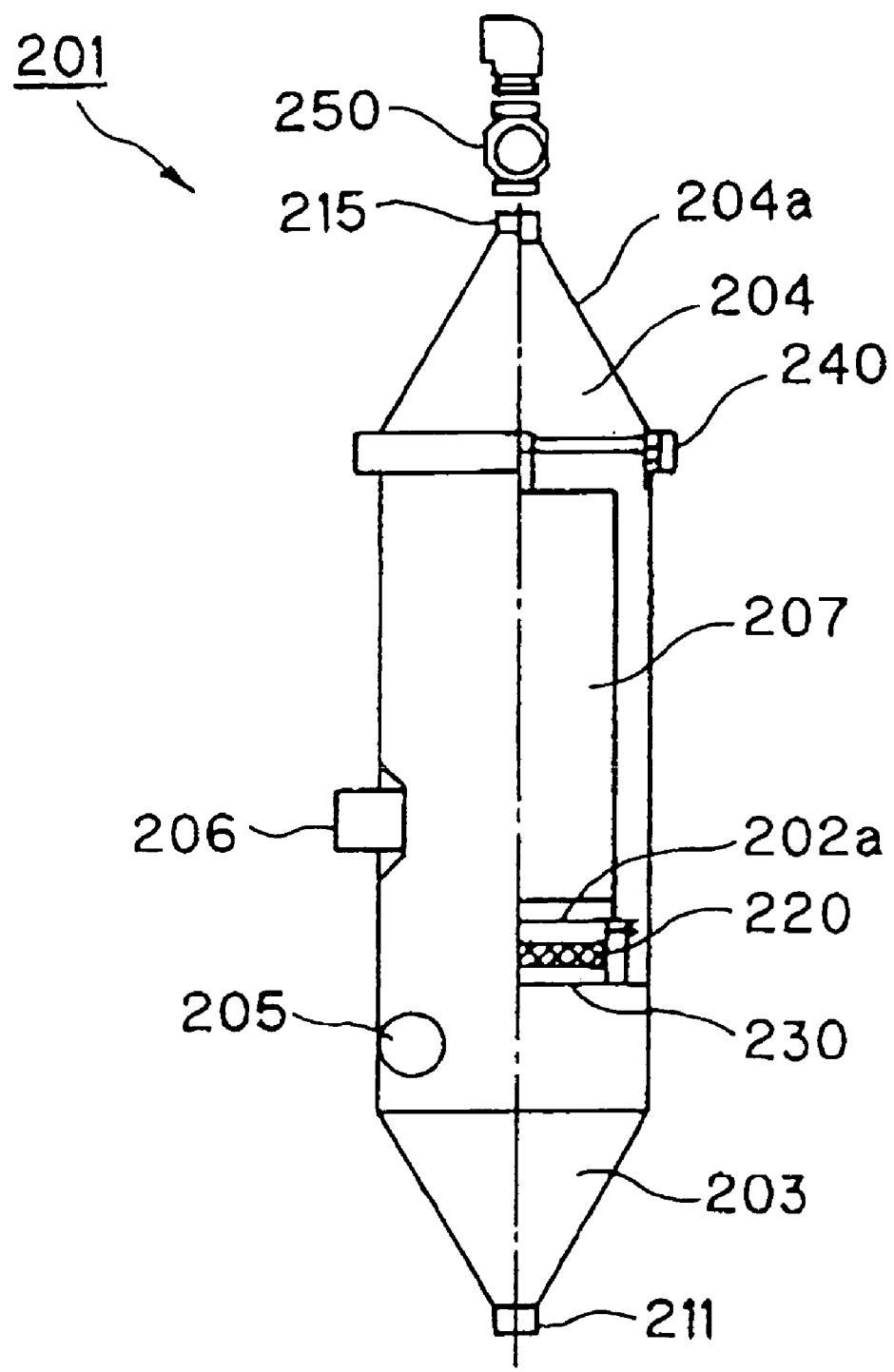
FIG. 6 is a cross-sectional view, partly broken away, showing a filter device according to a second embodiment of the present invention.

First, in particular, explanation will be made on the entire configuration of the filter device according to the second embodiment of the present invention in reference to FIGS. 6 and 7. FIG. 6 is a cross-sectional view, partly broken away, showing the filter device according to the second embodiment of the present invention; and FIG. 7 is a cross-sectional view schematically showing the configuration of the filter device according to the second embodiment of the present invention.

Figure 7:
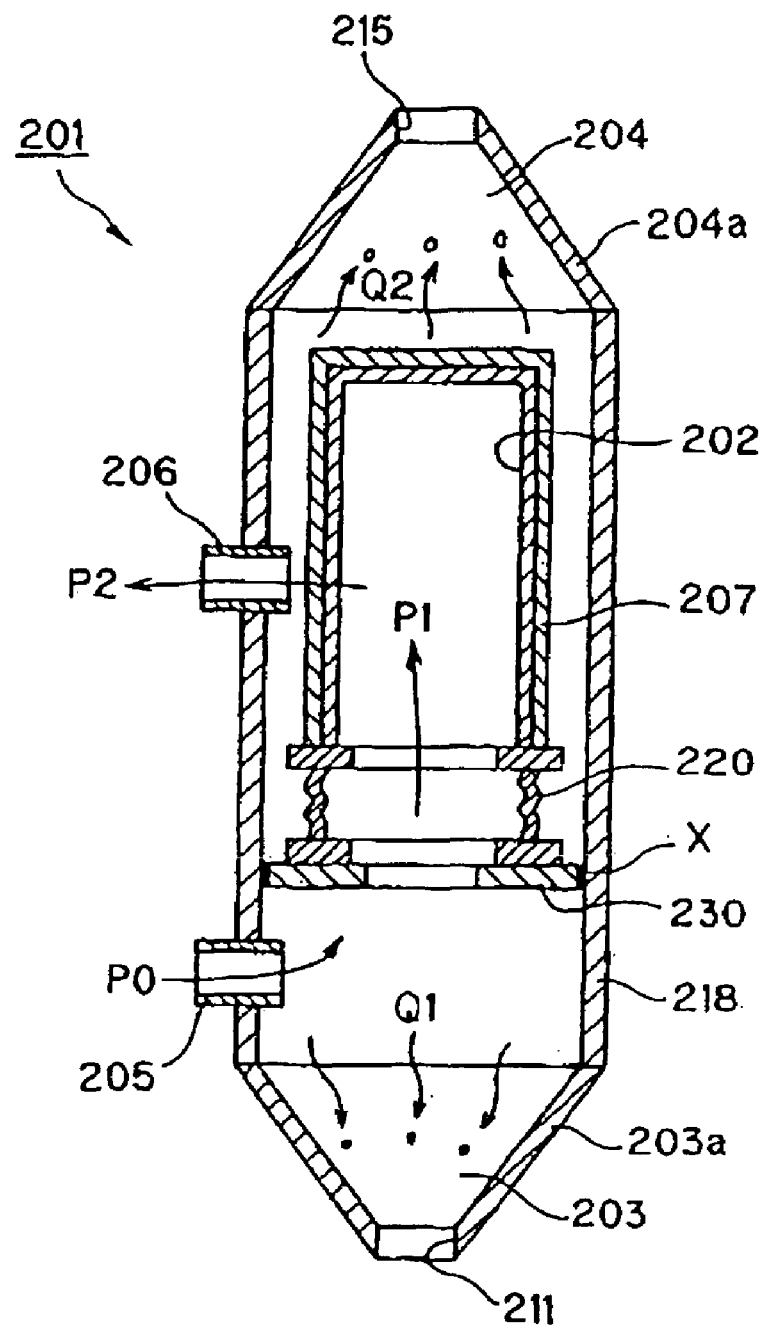
FIG. 7 is a cross-sectional view schematically showing the configuration of the filter device according to the second embodiment of the present invention.

As shown in FIGS. 6 and 7, a filter housing in a filter device 201 according to the present embodiment comprises a housing body 218 accommodating a filter bag (i.e., a bag-like filter) 202, a housing cover 203a, which is disposed under the housing body 218 and forms a deposit recovery tank 203 for recovering a deposit, and a housing cover 204a, which is disposed above the housing body 218 and forms a floating material recovery tank 204 for recovering a floating material.

Figure 8:
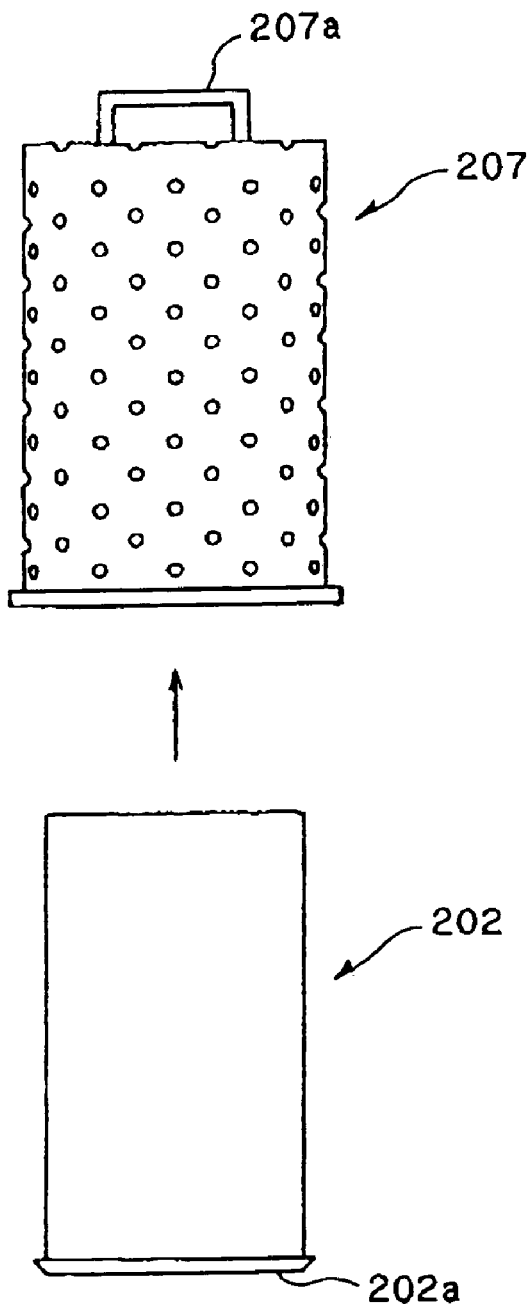
FIG. 8 is a front view schematically showing the state in which a filter bag is inserted into a bag filter bucket.

The filter bag 202 accommodated in the housing body 218 is inserted into a mesh-like bag filter bucket 207 made of metal or the like (such as a punching metal or a metal mesh) (see FIG. 8).

Incidentally, FIG. 8 is a front view showing the state in which the filter bag 202 is inserted into the bag filter bucket 207.

Inside of the housing body 218 is fixed a ring 230 constituted of a flat and rigid body. Here, a structure for fixing the ring 230 is not particularly limited. For example, the outer periphery of the ring 230 may be welded to the inner circumference of the housing body 218 (see reference character X in FIG. 7).

Furthermore, inside of the housing body 218 is disposed an opening end seal 220 interposed between the ring 230 and an opening end 202a of the filter bag 202.

Incidentally, the filter device 1 is used such that the opening of the bag-like filter bag 202 is oriented downward, like in the first embodiment.

To the lower portion of the housing body 218 is fixed the housing cover 203a having a substantially conical shape. The inside of the housing cover 203a functions as the deposit recovery tank 203 for recovering a deposit.

Moreover, the inner wall surface of the housing cover 203a is formed into a substantially conical shape having a diameter reduced toward a recovery port 211 for recovering the deposit. Consequently, since the deposit falls toward the recovery port 211 along the inner wall surface, the deposit can be readily recovered.

To the upper portion of the housing body 218 is fixed the housing cover 204a having a substantially conical shape. The inside of the housing cover 204a functions as the floating material recovery tank 204 for recovering a floating material.

Moreover, the inner wall surface of the housing cover 204a is formed into a substantially conical shape having a diameter reduced toward a recovery port 215 for recovering the floating material. Consequently, since the floating material floats toward the recovery port 215 along the inner wall surface, the floating material can be readily recovered.

Here, it is preferable that a sight glass should be attached in the recovery port 211 or recovery port 215 so as to confirm the deposit or floating material to be recovered. FIG. 6 shows a sight glass 250 attached onto the side of the recovery port 215.

Figure 9A:
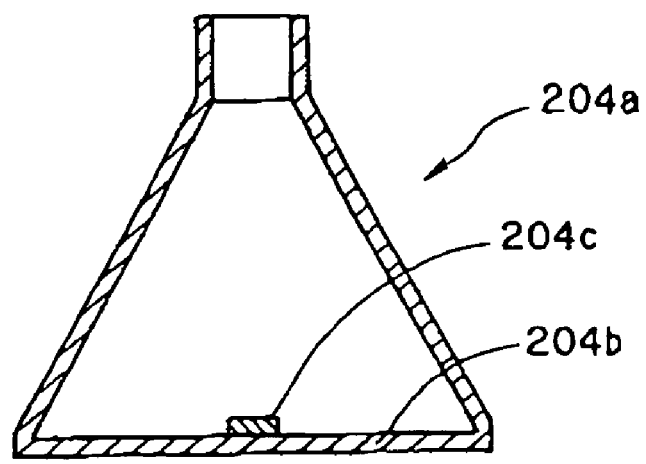
FIGS. 9A and 9B are views schematically showing a housing cover.
Figure 9B:
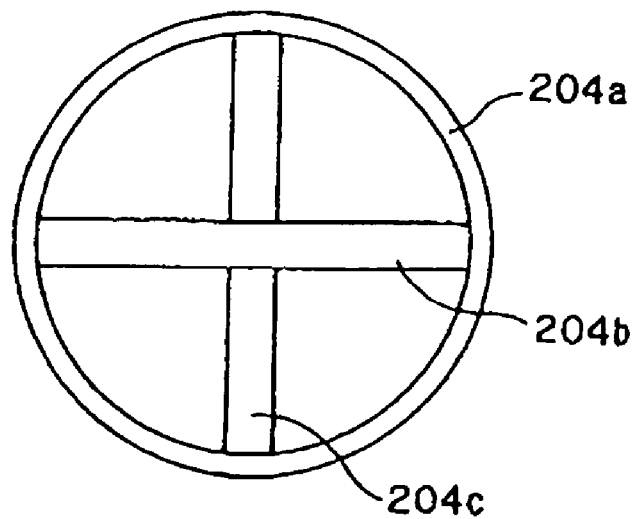

Additionally, in the housing cover 204a are disposed pressers 204b and 204c for supporting the bag filter bucket 207 (see FIGS. 9A and 9B). Incidentally, FIGS. 9A and 9B are views schematic showing the housing cover, wherein FIG. 9A is a schematic cross-sectional view as viewed from the front, and FIG. 9B is a schematically bottom view.

Figure 10:
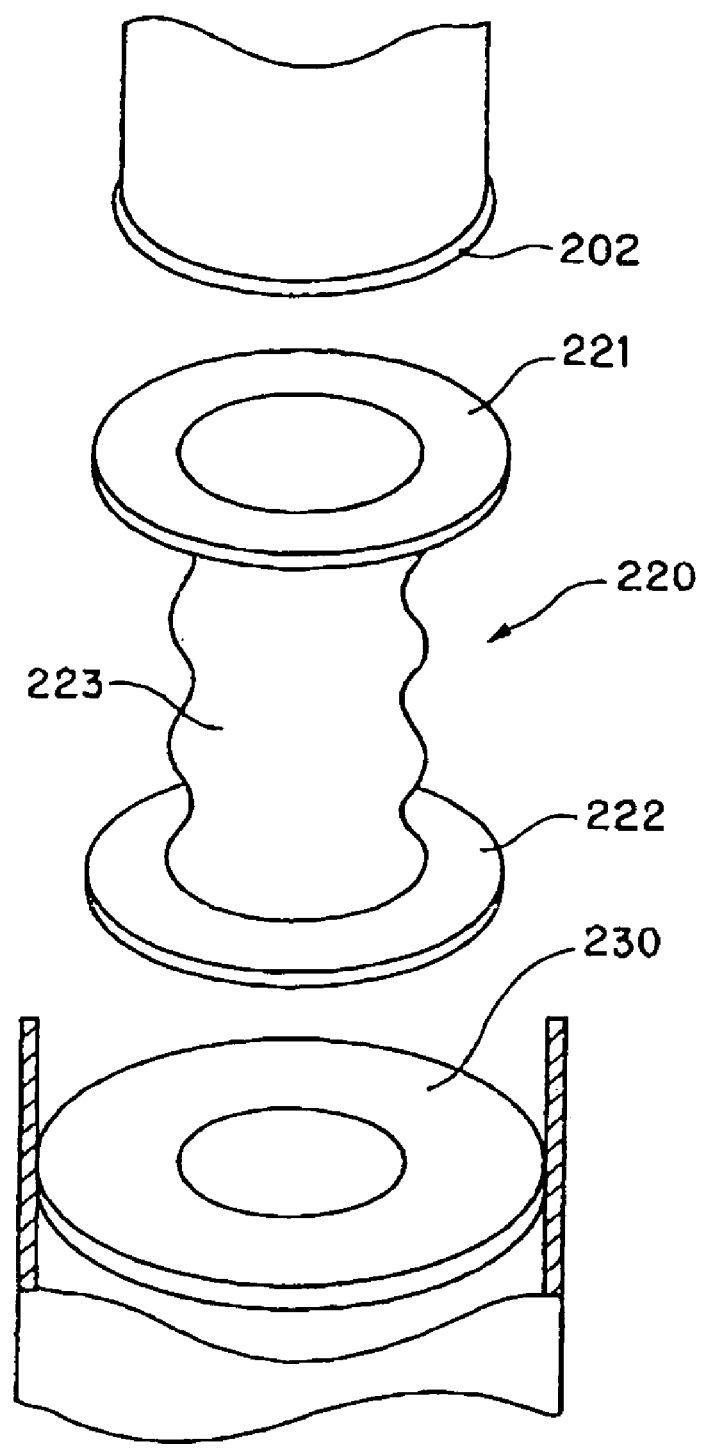
FIG. 10 is an exploded view showing the vicinity of an opening end seal in the filter device according to the second embodiment of the present invention.

As shown in FIG. 10, the opening end seal 220 comprises a first ring 221, with which the opening end 202a of the filter bag 202 and the opening end of the bag filter bucket 207 are brought into contact, a second ring 222 supported in contact with the ring 230 fixed to the housing body 218, and a seal body 223, which is interposed between the rings 221 and 222 and is formed into a substantially cylindrical shape (sleeve-like) having expansibility and contractility (such as a metallic bellows, a rubber bellows or a sheet).

Here, the opening end seal 220 exhibits the function of sealing the liquid to be filtered. The material of the first and second rings 221 and 222 may be, for example, metal or a resin. The material of the seal body 223 may be, for example, metal, rubber or cloth.

Moreover, the opening end seal 220 is equipped with the function of positioning and supporting the filter bag 202 and the bag filter bucket 207.

That is to say, the opening end seal 220 biases the filter bag 202 and the bag filter bucket 207 toward the housing cover 204a. Consequently, a handle 207a attached to the bag filter bucket 207 is pressed against the pressers 204b and 204c disposed in the housing cover 204a. In this manner, the filter bag 202 and the bag filter bucket 207 are positioned. Here, each of the housing cover 204a, the pressers 204b and 204c, the bag filter bucket 207 and the handle 207a is made of a rigid body.

As described above, the opening end seal 220 must bias the filter bag 202 and the bag filter bucket 207. However, in the case where sufficient biasing force can be hardly achieved only by the seal body 223, a spring 224 may be disposed, as shown in FIG. 11A, or a plate spring 225 may be disposed, as shown in FIG. 11B.

Figure 11A:
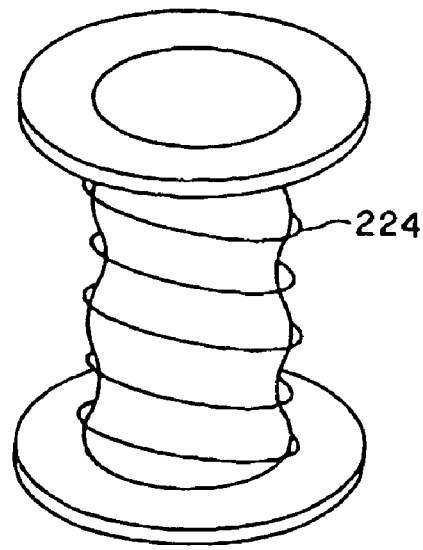
FIGS. 11A and 11B are perspective views showing concrete examples of the opening end seal.

In a type shown in FIG. 11A, for example, the first ring 221 and the second ring 222 are made of a metallic rigid body, and the seal body 223 is a rubber bellows. The rubber bellows is hardened in the ring made of the metallic rigid body, and then, a coil spring is wound around the rubber bellows.

Figure 11B:
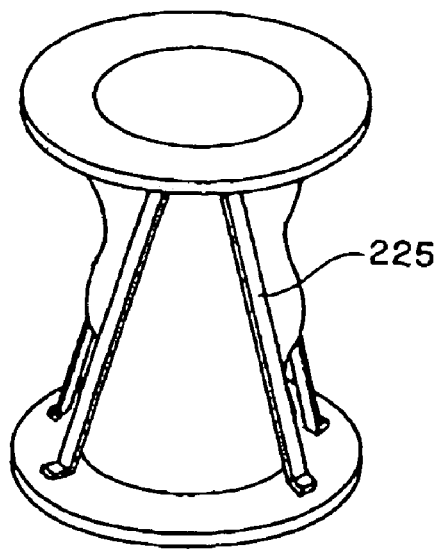

In the meantime, in a type shown in FIG. 11B, for example, the first ring 221 and the second ring 222 are made of a resin, and the seal body 223 is made of cloth. The cloth is deposited to the resin rings, which are supported by the plate spring.

At the housing body 218, there are formed an inlet 205 for introducing in the liquid to be filtered into the filter device 201, and an outlet 206 for running out the filtered liquid (i.e., the purified liquid).

The filter device 201 is used such that the inlet 205 is located under the opening end 202a of the filter bag 202 and above the deposit recovery tank 203, and further, that the outlet 206 is located above the inlet 205 and the opening end 202a of the filter bag 202 and under the floating material recovery tank 204.

Although the inlet 205 may be configured in such a manner as to be oriented toward the center, it is preferable that the inlet 205 should be located in such a manner that the liquid to be filtered flowing through the inlet 205 exhibits a cyclone effect. For example, if the inlet 205 is oriented in a tangential direction of the outer periphery of the cylindrical housing body 218, the flowing liquid to be filtered can exhibit the cyclone effect since it swirls.

In this manner, components having a heavy specific gravity out of components contained in the liquid to be filtered are collected on the outer periphery by a centrifugal force. As a result, the components having a heavy specific gravity can be efficiently recovered in the deposit recovery tank 203.

Next, a description will be given of the assembly of the filter device 201 according to the present embodiment (in particular, the installation of the filter).

First, the filter bag 202 is inserted into the bag filter bucket 207 (see FIG. 8).

In the meantime, the opening end seal 220 is set inside of the housing body 218. Specifically, the opening end seal 220 is put inside of the housing body 218 in such a manner that the second ring 222 is brought into contact with the ring 230 fixed to the housing body 218.

Then, the filter bag 202 is set in such a manner that the opening end 202a of the filter bag 202 is brought into contact with the first ring 221.

Subsequently, the housing cover 204a is put on the housing body 218, to be clamped by a clamp 240. At this time, since the pressers 204b, 204c and the handle 207a all are made of the rigid body, as described above, they cannot be deformed. The opening end seal 220 is contracted to generate an biasing force, thereby generating a pressing force between the pressers 204b, 204c and the handle 207a. Therefore, the opening end seal 220, the filter bag 202 and the bag filter bucket 207 are positioned (centered).

Moreover, the pressing force is generated also between the opening end of the filter bag 202 and bag filter bucket 207 and the first ring 221 of the opening end seal 220, and between the second ring 222 of the opening end seal 220 and the ring 230, thereby preventing any leakage of the liquid through clearances therebetween.

Here, explanation will be made on the biasing force by the opening end seal 220 (including the case where the biasing force is added by the spring 224 or the plate spring 225 in the configuration shown in FIGS. 11A and 11B).

The opening end seal 220 is hardly deformed only by putting the filter bag 202 and the bag filter bucket 207 on the opening end seal 220. The biasing force by the opening end seal 220 is set to such an extent that the opening end seal 220 is deformed by force in the case where the housing cover 204a is manually closed (clamped).

Therefore, even in the case where the component part such as the housing cover 204a or the housing body 218 has a dimensional error at the time of mass production or fluctuations in pressure are generated during use, the dimensional error can be absorbed by the opening end seal 220. Consequently, it is possible to prevent any malfunction that the liquid to be filtered flowing through the inlet 205 is leaked from a regular flow path (leaked from between the opening end of the filter bag 202 and the bag filter bucket 207 and the first ring 221 of the opening end seal 220, and between the second ring 222 of the opening end seal 220 and the ring 230), and then, flows out not through the filter but through the outlet 206.

Next, a description will be given of operation at the time of filtration in reference to FIG. 7. Here, since a basic operation is the same as that in the first embodiment, it will be simply explained.

When the liquid to be filtered flows in through the inlet 205 (as indicated by an arrow P0), the settling particles having a great specific gravity are deposited in the deposit recovery tank 203 by the effect of specific gravity or cyclone.

Since the inner wall of the deposit recovery tank 203 is formed into a substantially conical shape, the deposits stay in the vicinity of the recovery port 211. The staying deposits are appropriately recovered through the recovery port 211.

In the meantime, the liquid to be filtered flowing in a direction indicated by an arrow P1 is filtered by the filter bag 202. Consequently, the particles having a diameter greater than the pore diameter of the filter out of the components contained in the liquid to be filtered are trapped by the filter.

The components having a smaller specific gravity such as floating oil out of the components filtered by the filter float up as the floating material (as indicated by an arrow Q2), and then, stay in the floating material recovery tank 204. The fact that the components stay in the vicinity of the recovery port 215 is the same as the case of the deposit recovery tank 203. The staying floating material is appropriately recovered through the recovery port 215.

In this manner, only the filtered liquid, from which the deposit, the floating material and the particles trapped by the filter are removed, is allowed to flow out of the outlet 206 (as indicated by an arrow P2).

The filter of the filter bag 202 is clogged with time by long-term use. Therefore, pressure is gradually increased from a primary side of the filter to a secondary side thereof.

However, in the case of the filter device 201 in the present embodiment, the filter bag 202 and the bag filter bucket 207 are supported on the side opposite to the opening ends by the rigid body. Consequently, it is possible to prevent any misalignment of the filter bag 202 and the bag filter bucket 207.

Figure 12:
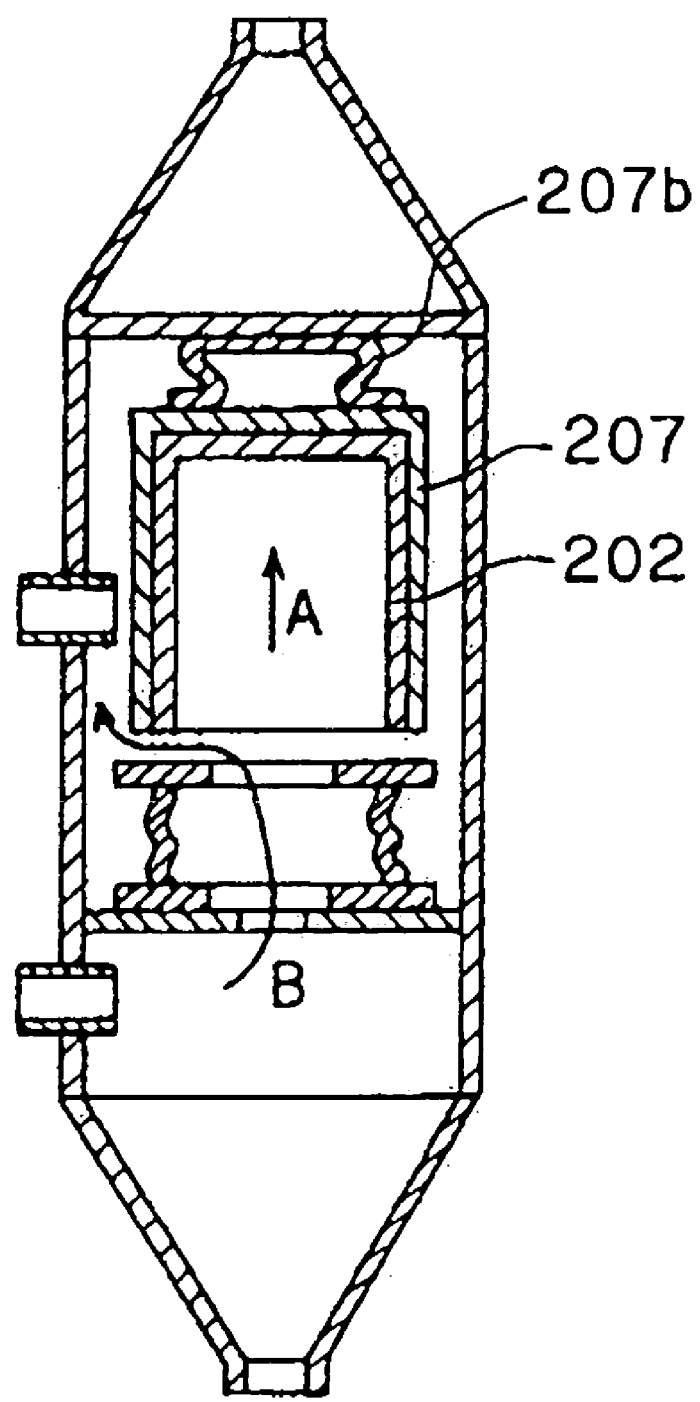
FIG. 12 is a cross-sectional view schematically showing a filter device in a comparative example.

Incidentally, if the filter bag 202 and the bag filter bucket 207 are elastically supported on the side opposite to the opening ends, there arises an malfunction as follows: in the case where, for example, a handle of the bag filter bucket 207 is constituted of an elastic handle 207b, as shown in FIG. 12, the filter bag and the bag filter bucket are shifted in a direction indicated by an arrow A, when the pressure is increased from the primary side of the filter to the secondary side, and thus, the handle 207b is deformed. As a consequence, a clearance is generated between the opening ends of the filter bag and the bag filter bucket and the opening end seal, thereby causing leakage in a direction indicated by an arrow B.

In contrast, the above-described problem cannot arise owing to the rigid support in the present embodiment.

As described above, there can be produced the effects of the easy recovery of the deposit or the floating material and excellent recovery efficiency of the deposit or the floating material in the present embodiment in addition to the effects described in the first embodiment.

As for the assembly, the component parts can be positioned and the leakage can be prevented by the simple work of putting the opening end seal, the filter bag and the bag filter bucket. Thus, there is an advantage of excellent assembling workability.

Next, an example of a system in which the filter device 201 according to the embodiment is effectively used will be explained in reference to FIG. 13.

EXAMPLE 4

Figure 13:
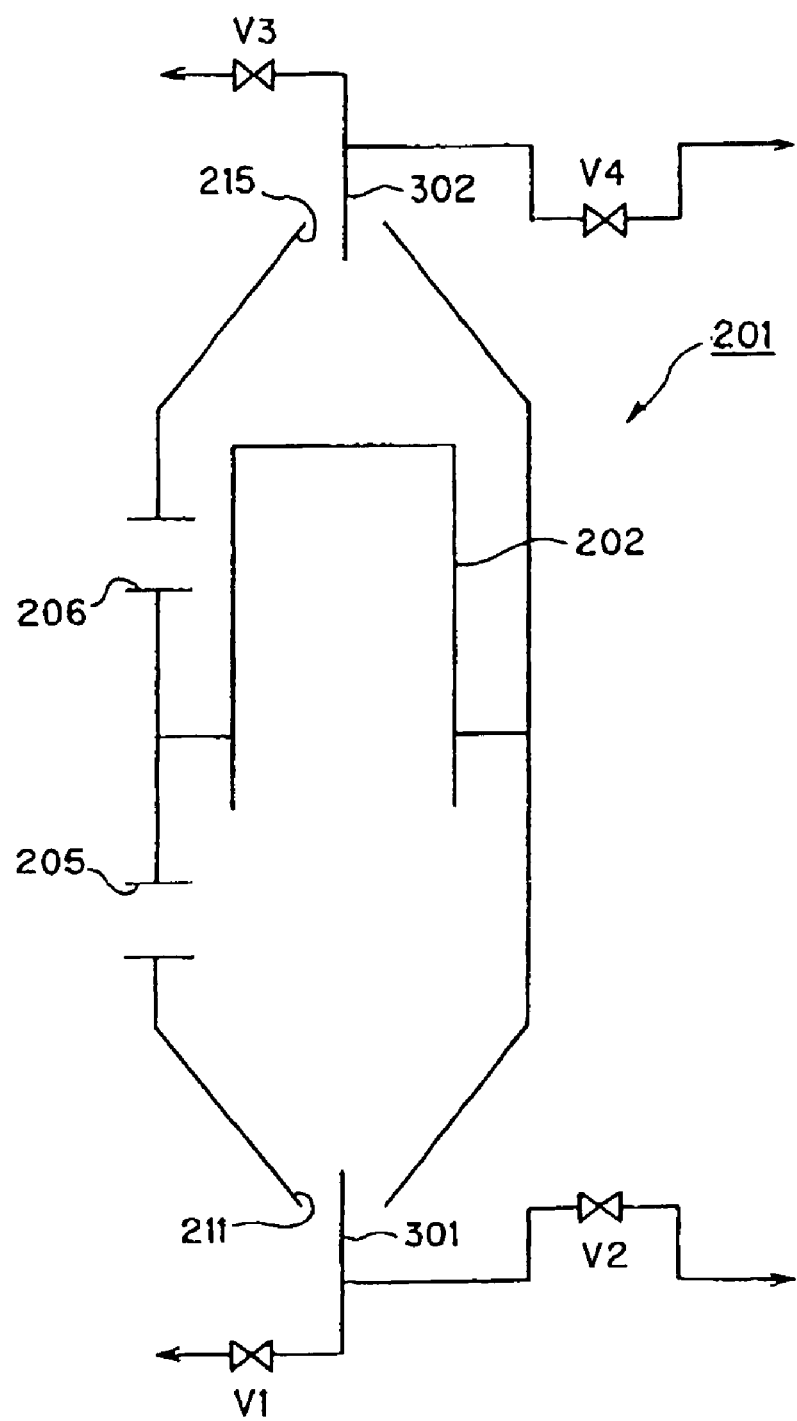
FIG. 13 is a diagram illustrating the flow of a filter system in a fourth example.

FIG. 13 is a diagram illustrating the flow of a filter system in a fourth example, in which the filter device in the second embodiment is used.

As illustrated in FIG. 13, to a recovery port 211 is connected a riser 301 serving as a first pipe, and further, to a recovery port 215 is connected a down pipe 302 serving as a second pipe.

In the filter system, valves V1 and V3 are closed while valves V2 and V4 are opened during a normal operation, and thus, fluid is allowed to flow at a constant rate (which may be zero in any case) via the valves V2 and V4. Consequently, a deposit or a floating material can be recovered (discharged) at all times.

Furthermore, in the filter system, in the case where the deposit or the floating material is collected in the pipe, the valves V1 and V3 are opened, and then, the fluid is discharged at a flow rate greater than that in the valves V2 and V4. Consequently, it is possible to remove the collected deposit or floating material, thereby enhancing trapping performance.

THIRD EMBODIMENT

Referring to FIGS. 14 to 17, a description will be given of a filter device according to a third embodiment of the present invention. In the present embodiment, there is provided a floating material separating tank for separating fluid containing a floating material staying in a floating material recovery tank by specific gravity difference separation in addition to the configurations of the filter devices 1, 1a and 201 according to the above-described embodiments (for the convenience of explanation, a filter device is designated by reference character 1' in the present embodiment).

Since the filter devices in the above-described embodiments can be used as the filter device 1', the explanation of the filter device 1' will be omitted below.

Figure 14:
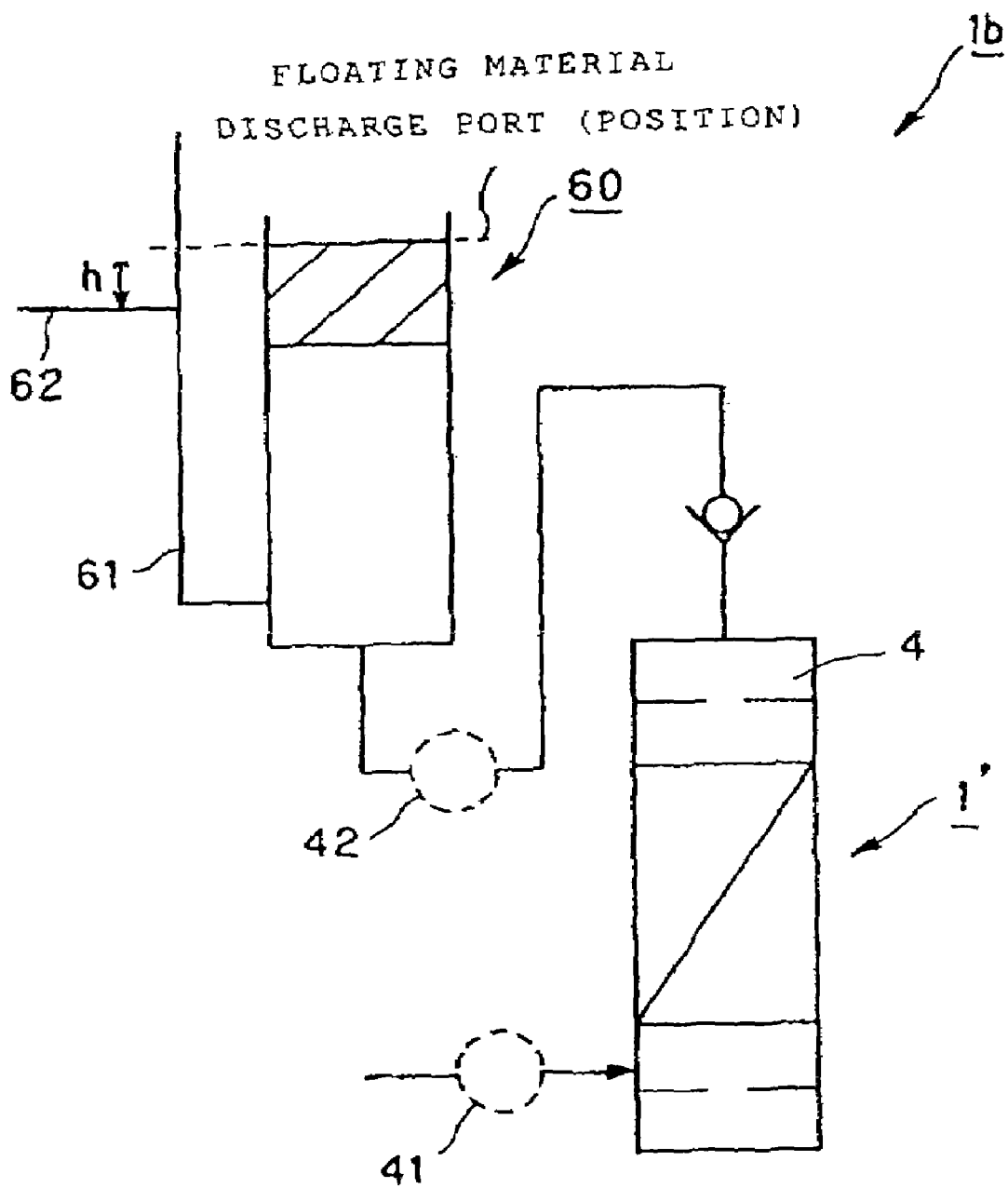
FIG. 14 is a view schematically showing a filter device according to a third embodiment of the present invention.

FIG. 14 is a view schematically showing a filter device according to a third embodiment of the present invention.

A filter device 1b in the present embodiment comprises the filter device 1' and a floating material separating tank 60. Here, any of the configurations of the filter devices 1, 1a and 201 in the above-described embodiments and examples can be used as the filter device 1'.

Moreover, the filter device 1b comprises a pump for feeding fluid (liquid) from a floating material recovery tank 4 to the floating material separating tank 60. Incidentally, at least either one of a push pump 41 and a suction pump 42 is sufficient.

In the filter device 1b, the fluid containing a floating material staying in the floating material recovery tank 4 is fed to the floating material separating tank 60 by the pump. In the floating material separating tank 60, a component having a small specific gravity and a component having a great specific gravity are separated by the specific gravity difference separation. That is to say, the floating material is further separated in the floating material separating tank 60.

Consequently, the provision of the floating material separating tank 60 can further enhance floating material separating ability. In other words, the floating material can be separated with high purity, thereby reducing the discharge quantity of the floating material.

The configuration of the floating material separating tank 60 is not particularly limited as long as the specific gravity difference separation can be preferably performed. Here, a preferred example will be explained below in reference to FIG. 14.

As illustrated in FIG. 14, a riser 61 is disposed near the bottom of the floating material separating tank 60. Furthermore, a return pipe 62 is connected to the riser 61 and is located at a position lower than a floating material discharge port formed at the floating material separating tank 60.

In FIG. 14, reference character h designates a difference in height between the return pipe 62 and the floating material discharge port. Incidentally, the return pipe 62 is a pipe for returning the fluid (the fluid excluding the floating material) separated in the floating material separating tank 60 to a cleaning tank 30 or the like.

The upper portions of the floating material separating tank 60 and the riser 61 are bled such that atmospheric pressure is applied to the fluid staying inside.

With this configuration, when the floating material (such as oil) staying inside the floating material separating tank 60 is increased, a liquid level in the tank is elevated by a specific gravity difference, so that the floating material freely falls, and then, is discharged from the floating material discharge port.

Figure 17A:
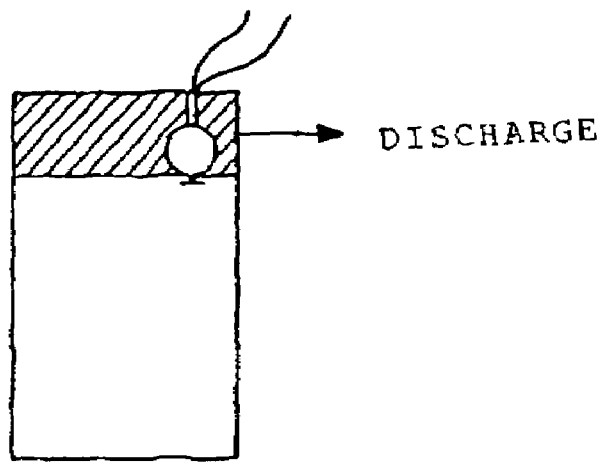
FIGS. 17A and 17B are views schematically showing oil-water separating devices in the conventional art.
Figure 17B:
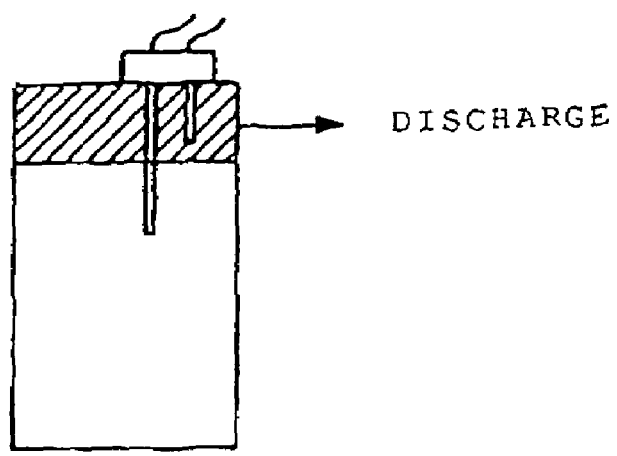
Figure 18:
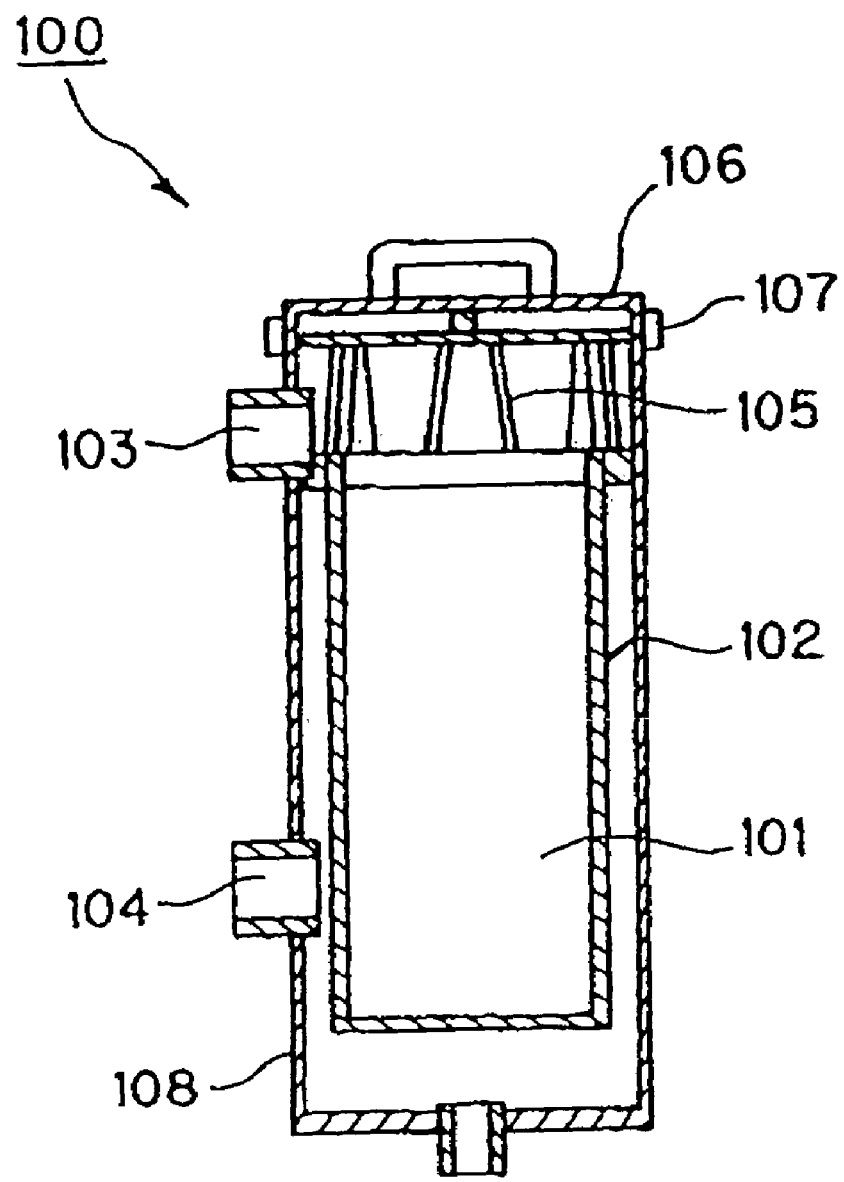
FIG. 18 is a cross-sectional view schematically showing the configuration of a bag filter according to the conventional art.
Figure 19:
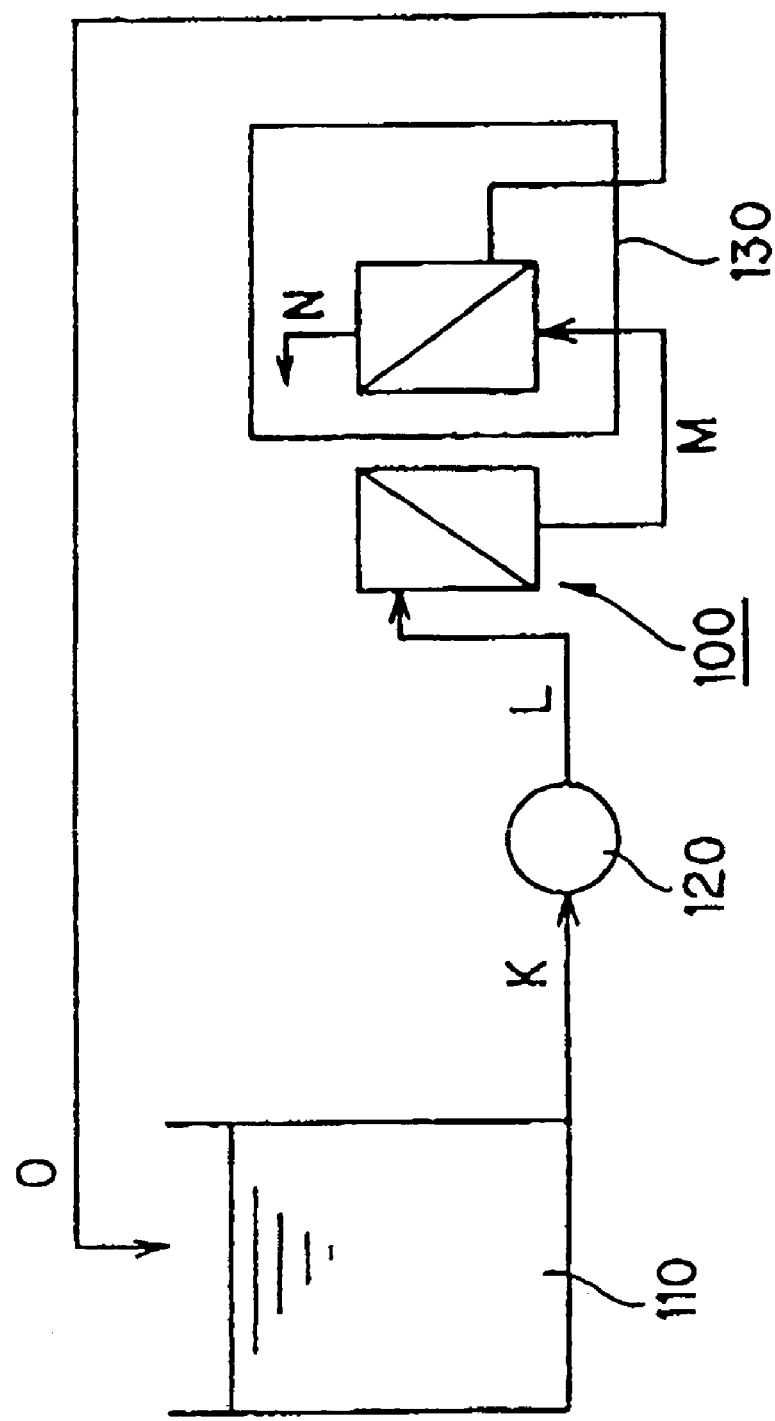
FIG. 19 is a diagram illustrating the flow of a filter system by the use of the bag filter according to the conventional art.
Figure 20:
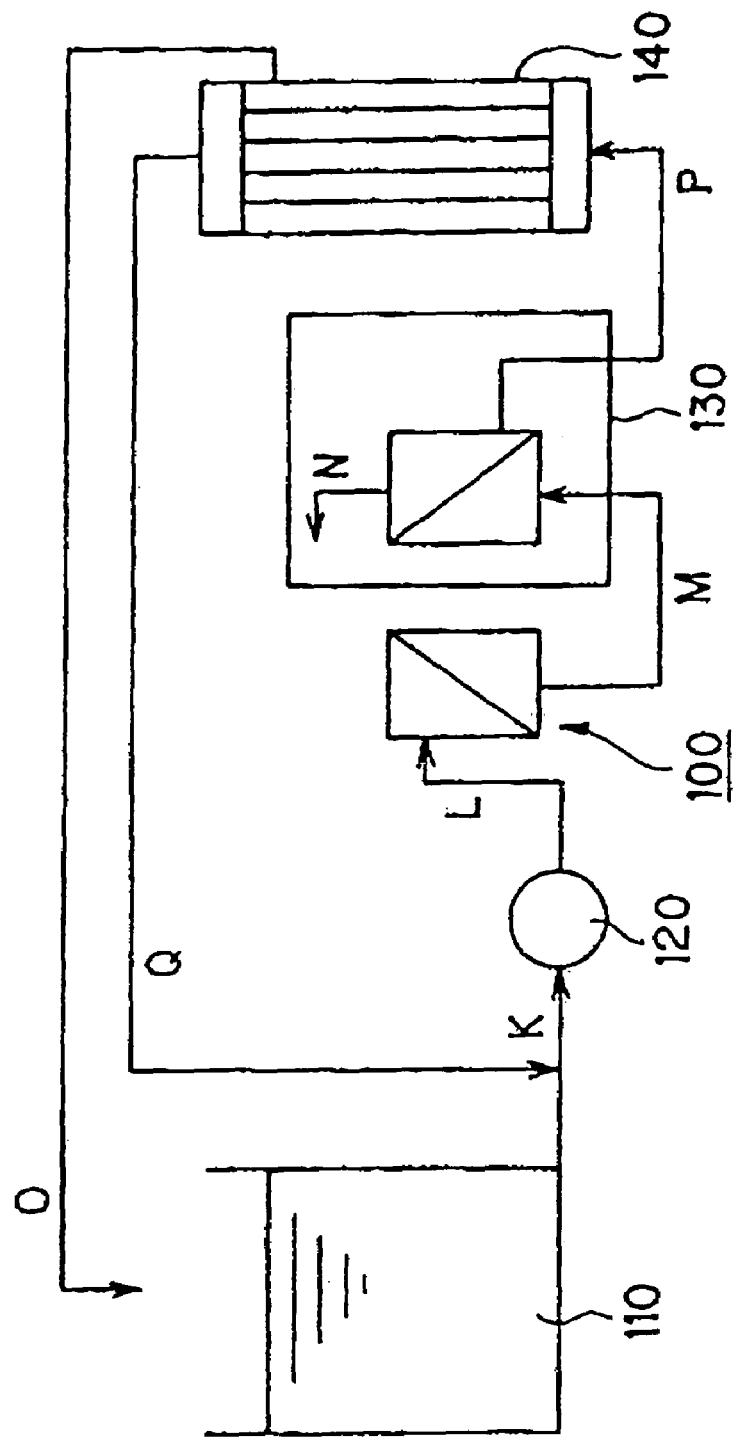
FIG. 20 is a diagram illustrating the flow of a filter system by the use of the bag filter according to the conventional art.

A well-known device for separating water and oil will be explained in reference to FIGS. 17A and 17B. FIGS. 17A and 17B are views schematically showing oil-water separating devices in the conventional art.

FIG. 17A shows a float type device. The device shown in FIG. 17A is provided with a float switch which is greater in specific gravity than oil while is smaller in specific gravity than water. When a float of the float switch is sunk, a valve is opened, and then, the oil is discharged.

In this device, if the boundary between the water and the oil is clear, the effect of separating the oil can be preferably exhibited. However, in the case where the floating material contains emulsified oil or oil having a specific gravity greater than initially expected, the float cannot be sunk, thereby raising a drawback that the oil cannot be discharged.

FIG. 17B shows an electrode type device. The device shown in FIG. 17B is provided with an electrode type level switch. In the state in which the electrode type level switch is not energized, it is interpreted that an oil level reaches the position of an electrode, and thus, a valve is opened, so that the oil is discharged.

In the case where the device is used for a long time, the oil is stuck to the electrode, there arises a problem that the water is continued to be discharged without energization irrespective of the water surrounding the electrode.

As described above, the floating material separating tank 60 illustrated in FIG. 14 cannot raise the drawbacks in the float type or electrode type device, and therefore, it can be preferably used in the filter device 1b in the present embodiment.

Subsequently, explanation will be made on two kinds of examples of systems, in which the filter device 1b in the present embodiment is effectively used, in reference to FIGS. 15 and 16.

EXAMPLE 5

Figure 15:
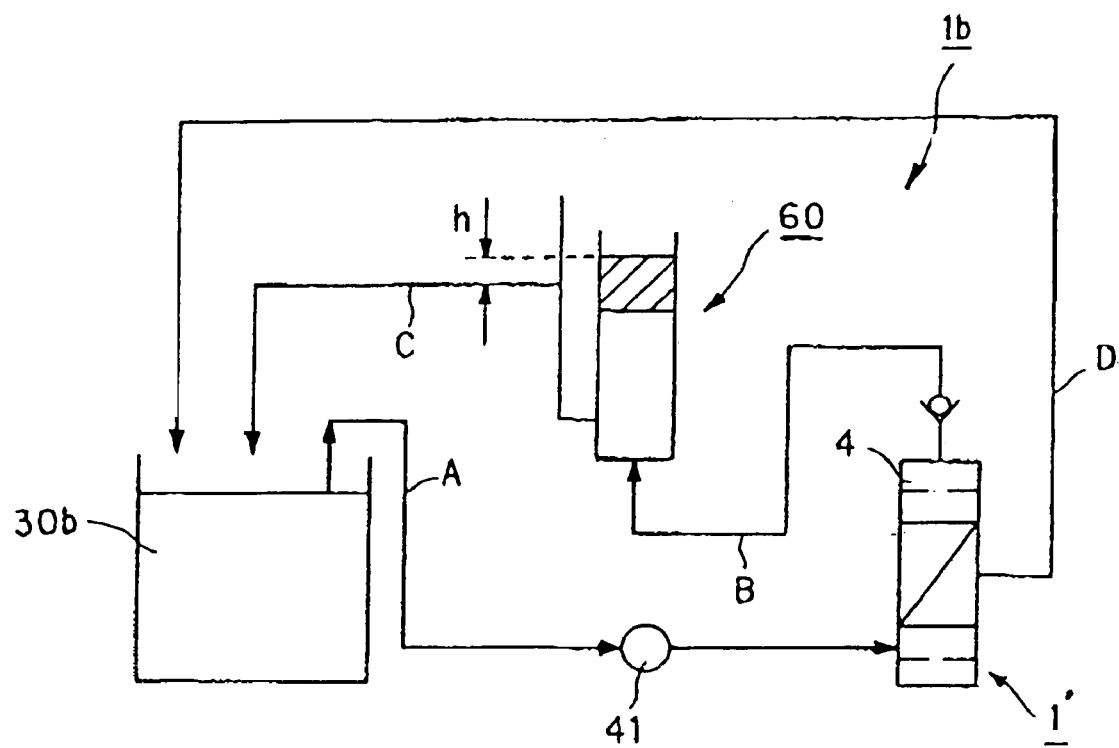
FIG. 15 is a diagram illustrating the flow of a filter system according to a fifth example by the use of the filter device according to the third embodiment.

FIG. 15 is a diagram illustrating the flow of a filter system in a fifth example by the use of the filter device according to the third embodiment.

This system is adapted to separate and remove chippings of a workpiece and an oil component from a water-based metallic part cleaning liquid.

In this filter system, the filter device 1b in the above-described third embodiment is disposed downstream of a tank 30b containing therein the water-based metallic part cleaning liquid.

In this filter system, the water-based metallic part cleaning liquid contained in the tank 30b is fed to the filter device 1' from the tank 30b via a flow path A by the push pump 41.

The chippings contained in the water-based metallic part cleaning liquid are recovered as deposits in the filter device 1'.

The liquid filtered in the filter device 1' is returned to the tank 30b via a flow path D.

In the meantime, the liquid (the liquid containing the oil component as the floating material) staying in the floating material recovery tank 4 in the filter device 1' is fed to the floating material separating tank 60 via a flow path B. The oil and the water are separated in the floating material separating tank 60, and then, only the purified water is returned to the tank 30b via a flow path C.

Here, the oil component separated in the floating material separating tank 60 is discharged.

By the use of the above-described system, oil removing efficiency can be enhanced. Namely, the purity of waste oil is increased, so that an oil discharge quantity can be reduced.

Specific explanation will be made below on this system.

The pump capacity of the push pump 41 is set to 20 L (liter)/min.

Furthermore, a flow rate from the filter device 1' to the floating material separating tank 60 is set to 2 L/min. The flow rate can be adjusted by setting the diameter of the pipe or disposing the valve on the way of the pipe.

The volume of the floating material separating tank 60 is set to 40 L, and thus, the liquid flowing into the floating material separating tank 60 can stay for 20 min.

In this manner, the flow rate of the purified liquid returned from the filter device 1' to the tank 30b can be 18 L/min, and the flow rate of the purified liquid returned from the floating material separating tank 60 to the tank 30b can be [2— (floating oil discharge quantity)] L/min.

That is to say, the liquid in the tank can be purified with high accuracy at about 19 L/min, although it depends on the quantity of the floating oil.

EXAMPLE 6

Figure 16:
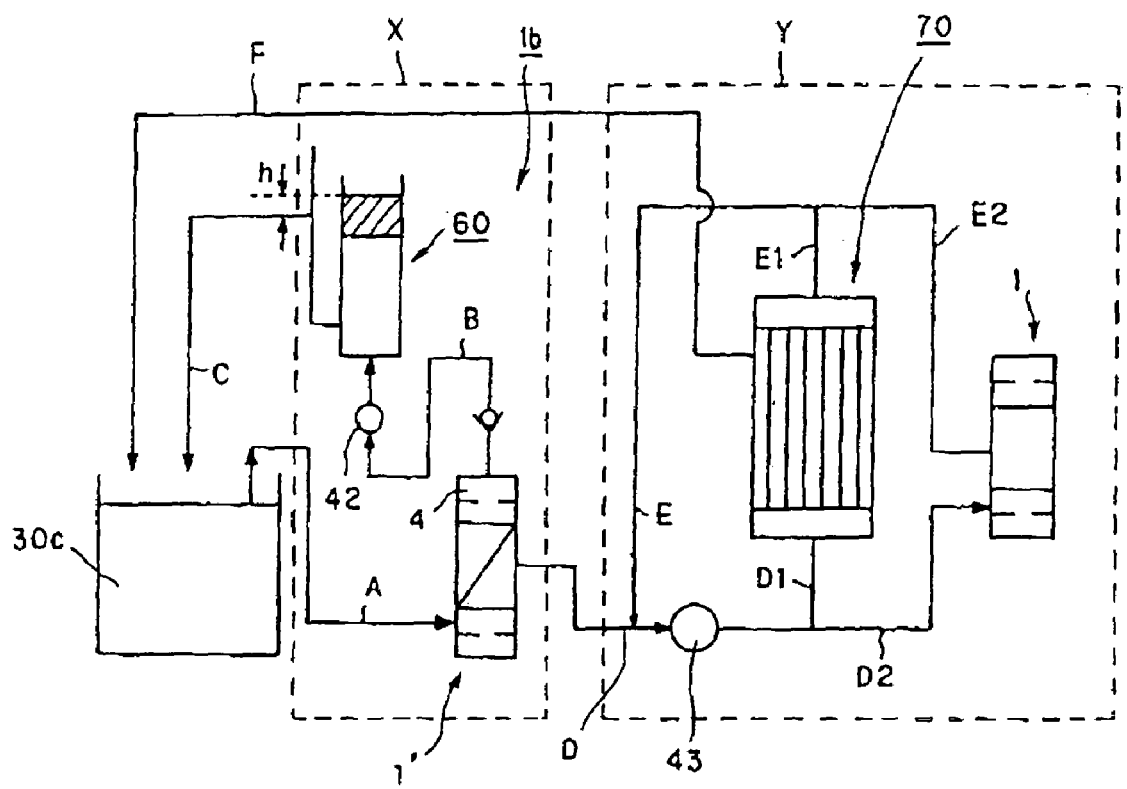
FIG. 16 is a diagram illustrating the flow of a filter system according to a sixth example by the use of the filter device according to the third embodiment.

FIG. 16 is a diagram illustrating the flow of a filter system in a sixth example by the use of the filter device in the third embodiment.

Like in the above-described fifth example, this system is adapted to separate and remove chippings of a workpiece and an oil component from a water-based metallic part cleaning liquid.

This system is schematically constituted of a pre-process step X and a membrane type oil-water separating step Y.

The filter device 1b according to the third embodiment is used in the pre-process step X; and the filter device 1' (1, 1a and 201) according to the first and second embodiments is used in the membrane type oil-water separating step Y.

In this system, first, the oil and the water are separated in the pre-process step X, and then, particles and an emulsified liquid, which cannot be removed in the pre-process step X, are removed (purified) in the membrane type oil-water separating step Y.

In this filter system, the water-based metallic part cleaning liquid staying in a tank 30c is fed to the filter device 1' in the pre-process step X from the tank 30c via a flow path A by a suction pump 42 and a circulation pump 43.

The chippings contained in the water-based metallic part cleaning liquid are recovered as deposits in the filter device 1' in the pre-process step X.

In the meantime, liquid (liquid containing an oil component as a floating material) staying in a floating material recovery tank 4 in the filter device 1' in the pre-process step X is fed to a floating material separating tank 60 via a flow path B. The oil and the water are separated in the floating material separating tank 60 and only the purified water passes via a flow path C, and then, is returned to the tank 30c.

Incidentally, the oil component separated in the floating material separating tank 60 is discharged.

The liquid filtered in the filter device 1' in the pre-process step X (i.e., the liquid containing the particles and the emulsified liquid which cannot be removed in the pre-process step X) passes via a flow path D, and then, branches to a flow path D1 and a flow path D2.

The liquid via the flow path D1 is subjected to cross-flow filtration under the pressure of the circulation pump 43 by a hollow-fiber membrane module 70. The filtered liquid of high purification accuracy, which is filtered through the hollow-fiber membrane module 70, is returned to the tank 30c via a flow path F.

In the meantime, the liquid which has not filtered by the hollow-fiber membrane module 70 is circulated again via a flow path E1 and a flow path E.

Moreover, the liquid on the flow path D2 is fed to the filter device 1' in the membrane type oil-water separating step Y.

Then, the chippings as the deposits and the oil as the floating material (mainly an emulsified layer) are recovered by the filter device 1'. Incidentally, the chipping and the oil is appropriately discharged.

The liquid filtered by the filter device 1' in the membrane type oil-water separating step Y is circulated again via a flow path E2 and the flow path E.

In this manner, the purified liquid can be obtained with high purification accuracy by the cross-flow filtration in the membrane type oil-water separating step Y. Moreover, the particles (the deposits) and the oil (the floating material) can be condensed, and then, removed.

Incidentally, if sludge or floating oil is mixed in a large quantity in the system in which there is provided only the membrane type oil-water separating step Y, it adheres to the membrane surface of the hollow-fiber membrane module. As a result, the filter is clogged for a short period. Therefore, the pre-process step X is provided in the present system.

In the illustrated example, the filter device 1b according to the third embodiment is disposed upstream of the circulation pump 43. Consequently, there is provided no push pump, unlike in the fifth example. Therefore, the liquid cannot be fed to the floating material separating tank 60 from the filter device 1' in the pre-process step X only by the same pipe as that in the fifth example.

As a consequence, a self-feed type mini pump having the capacity of about 2 L/min is provided as the suction pump 42.

Incidentally, a push pump may be provided in the pre-process step X, like in the fifth example. In this case, a part of the liquid filtered by the filter device 1' in the pre-process step X is sucked in the membrane type oil-water separating step Y.

As described above, according to the present invention, the provision of the deposit recovery tank can allow the impurity particles which are not filtered but separated to be deposited and recovered in the deposit recovery tank. Consequently, it is possible to reduce the adhesion and deposition of the impurity particles to and in the membrane of the filter and to prevent any degradation of the filtration performance due to the filtered and separated impurities, so as to enhance the quality.

If an orifice is formed at an inlet of the deposit recovery tank, it is possible to prevent any agitation of the deposit deposited inside of the deposit recovery tank by the flowing liquid to be filtered. Therefore, the recovery of the deposit is not prevented.

The deposit recovery tank has the substantially conical inner wall surface whose diameter is reduced toward the recovery port, thus enhancing the recovering efficiency of the deposit.

The provision of the floating material recovery tank enables the filtration and separation by the filter and the specific gravity difference separation based on the specific gravity difference by the single device, thus reducing the number of component parts and the installation space.

If an orifice is formed at an inlet of the floating material recovery tank, it is possible to prevent any agitation of the floating material recovered inside of the floating material recovery tank by the flowing liquid to be filtered. Therefore, the recovery of the floating material is not prevented.

The floating material recovery tank has the substantially conical inner wall surface whose diameter is reduced toward the recovery port, thus enhancing the recovering efficiency of the floating material.

The provision of the opening end seal having the expansibility and contractility enables the filter bag to be easily attached.

The inlet is formed in such a manner as to exhibit the cyclone effect when the liquid to be filtered flows in so that the deposit can be efficiently recovered.

The filter bag is supported on the side opposite to the opening end of the filter bag by a member made of a rigid body, thereby preventing any shift of the filter bag so as to prevent any leakage.

The first pipe capable of discharging the deposit at all times is connected to the deposit recovery tank, and further, the second pipe capable of discharging the floating material at all times is connected to the floating material recovery tank. Thus, the trapping effect can be exhibited.

There are provided the floating material separating tank and the pump for feeding the fluid containing the floating material inside of the floating material recovery tank to the floating material separating tank, thus further achieving the specific gravity difference separation so as to enhance the recovery accuracy of the floating material.

What is claimed is:

1. A filter device comprising:
   a filter for filtering liquid to be filtered and separating impurity particles contained in the liquid to be filtered; and
   a deposit recovery tank for depositing particles having a specific gravity greater than that of the liquid to be filtered out of the impurity particles, which are not filtered but separated by the filter, so as to recover them at a position apart from the filter,
   the filter being a bag-like filter bag, the filter being disposed with an opening end thereof oriented downward at a time of installation, and
   an opening end seal formed into a substantially cylindrical shape having expansibility and contractility, one end of the seal being supported on a side of a case while the other end of the seal being brought into contact with the opening end of the filter bag.

2. A filter device according to claim 1, wherein the inlet for introducing the liquid to be filtered is formed on a side opposite to the filter bag across the opening end seal; and
   the inlet is disposed such that the liquid to be filtered flowing through the inlet can exhibit a cyclone effect.

3. A filter device according to claim 1, wherein the filter bag is supported on a side opposite to the opening end of the filter bag by a member constituted of a rigid body.

4. A filter device comprising:
   a filter for filtering liquid to be filtered and separating impurity particles contained in the liquid to be filtered; and
   a floating material recovery tank capable of allowing a component of a smaller specific gravity to float and recovering it out of liquid filtered by the filter, and
   the filter being a bag-like filter bag, the filter being disposed with an opening end thereof oriented downward at a time of installation.

5. A filter device according to claim 4, further comprising an opening end seal formed into a substantially cylindrical shape having expansibility and contractility, one end being supported on a side of a case while the other end being brought into contact with the opening end of the filter bag.

6. A filter device according to claim 5, wherein the inlet for introducing the liquid to be filtered is formed on a side opposite to the filter bag across the opening end seal; and
   the inlet is disposed such that the liquid to be filtered flowing through the inlet can exhibit a cyclone effect.

7. A filter device according to claim 4, wherein the filter bag is supported on a side opposite to the opening end of the filter bag by a member constituted of a rigid body.

8. A filter device comprising:
- a filter for filtering liquid to be filtered and separating impurity particles contained in the liquid to be filtered;
- a deposit recovery tank for depositing particles having a specific gravity greater than that of the liquid to be filtered out of the impurity particles, which are not filtered but separated by the filter, so as to recover them at a position apart from the filter; and
- a floating material recovery tank capable of allowing a component of a smaller specific gravity to float and recovering it out of liquid filtered by the filter, and
- the filter being a bag-like filter bag, the filter being disposed with an opening end thereof oriented downward at a time of installation.

9. A filter device according to claim 8, further comprising an opening end seal formed into a substantially cylindrical shape having expansibility and contractility, one end being supported on a side of a case while the other end being brought into contact with the opening end of the filter bag.

10. A filter device according to claim 9, wherein the inlet for introducing the liquid to be filtered is formed on a side opposite to the filter bag across the opening end seal; and the inlet is disposed such that the liquid to be filtered flowing through the inlet can exhibit a cyclone effect.

11. A filter device according to claim 8, wherein the filter bag is supported on a side opposite to the opening end of the filter bag by a member constituted of a rigid body.

* * * * *